US009985995B2

(12) United States Patent
McGann

(10) Patent No.: US 9,985,995 B2
(45) Date of Patent: *May 29, 2018

(54) METHOD AND ARRANGEMENT FOR MANAGING SECURITY RECONFIGURATION IN A CELLULAR COMMUNICATION SYSTEM

(71) Applicant: Telefonaktiebolaget L M Ericsson (publ), Stockholm (SE)

(72) Inventor: Tom McGann, Enfield (IE)

(73) Assignee: Telefonaktiebolaget L M Ericcson (publ), Stockholm (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/000,862

(22) Filed: Jan. 19, 2016

(65) Prior Publication Data

US 2016/0197965 A1 Jul. 7, 2016

Related U.S. Application Data

(63) Continuation of application No. 13/518,919, filed as application No. PCT/EP2010/058294 on Jun. 14, 2010, now Pat. No. 9,270,706.

(Continued)

(51) Int. Cl.
*H04L 29/06* (2006.01)
*H04W 12/04* (2009.01)
*H04W 24/02* (2009.01)

(52) U.S. Cl.
CPC ........... *H04L 63/205* (2013.01); *H04W 12/04* (2013.01); *H04W 24/02* (2013.01); *H04L 63/06* (2013.01)

(58) Field of Classification Search
CPC ....... H04L 63/06; H04L 63/205; H04L 63/04; H04L 63/20; H04L 9/0891; H04L 1/1621;
(Continued)

(56) References Cited

U.S. PATENT DOCUMENTS 7,801,527 B2 9/2010 Putcha
8,811,943 B2 8/2014 Funnell et al.
(Continued)

FOREIGN PATENT DOCUMENTS

EP 1 895 798 A1 3/2008

OTHER PUBLICATIONS

3GPP, "CRs to 34.123-1 for approval Batch 1", 3GPP, Jun. 1-3, 2005, 3GPP TSG RAN Meeting #28, RP-050271.*
(Continued)

*Primary Examiner* — Paul H Masur
*Assistant Examiner* — Michael K Phillips
(74) *Attorney, Agent, or Firm* — Sage Patent Group

(57) ABSTRACT

Methods are discussed of managing security reconfiguration and cell update procedures in a user equipment and in a node in a cellular communication system and a user equipment and a node in the cellular communication system. Methods in the user equipment may include detecting a cell update trigger event, and aborting any ongoing security reconfiguration procedure in the user equipment in response to the detected cell update trigger event. Subsequently, a security status indication in response to the aborted security reconfiguration may be provided, and a cell update message and the provided security status indication may be jointly transmitted to a node.

23 Claims, 8 Drawing Sheets

Related U.S. Application Data

(60) Provisional application No. 61/298,934, filed on Jan. 28, 2010.

(58) Field of Classification Search
CPC ... H04L 1/1628; H04L 1/1635; H04L 1/1657; H04L 1/1692; H04L 12/1868; H04L 12/5875; H04L 51/30; H04W 24/02; H04W 12/04; H04W 12/02; H04W 36/08; H04W 76/028; H04W 12/10; H04W 12/08
See application file for complete search history.

(56) References Cited

U.S. PATENT DOCUMENTS

| | | | |
|---|---|---|---|
| 9,270,706 | B2* | 2/2016 | McGann ............... H04W 24/02 |
| 2003/0035545 | A1 | 2/2003 | Jiang |
| 2003/0100291 | A1 | 5/2003 | Krishnarajah et al. |
| 2003/0236085 | A1 | 12/2003 | Ho |
| 2004/0224663 | A1 | 11/2004 | Funnell et al. |
| 2005/0276417 | A1 | 12/2005 | Funnell |
| 2007/0173228 | A1 | 7/2007 | Funnell et al. |
| 2007/0263871 | A1 | 11/2007 | Maheshwari et al. |
| 2009/0124212 | A1 | 5/2009 | Islam et al. |
| 2010/0002883 | A1* | 1/2010 | Sammour ........... H04L 63/1416 380/272 |
| 2010/0035599 | A1 | 2/2010 | Chen |
| 2010/0074203 | A1* | 3/2010 | Pani ...................... H04W 60/02 370/329 |
| 2010/0130207 | A1 | 5/2010 | Wu |
| 2010/0166184 | A1 | 7/2010 | Wu |
| 2012/0142354 | A1 | 6/2012 | Ahluwalia |
| 2012/0142361 | A1 | 6/2012 | Zhao et al. |
| 2012/0201228 | A1 | 8/2012 | Wu |
| 2012/0308007 | A1 | 12/2012 | Li et al. |

OTHER PUBLICATIONS

3GPP, "Security corrections", 3GPP, Feb. 18-22, 2002, 3GPP TSG-RAN2 Meeting #27, Orlando, USA, RP-020205.*
3GPP, "Miscellaneous procedure corrections", 3GPP, Feb. 19-23, 2001, 3GPP TSG-RAN WG2 Meeting #19, Sophia Antipolis, France, R2-010549.*
International Search Report, PCT Application No. PCT/EP2010/058294, dated Sep. 29, 2010, 3 pages.
3GPP TSG-RAN2 Meeting #27, Orlando, USA, Feb. 18-22, 2002, RP-020205, pp. 1-18.
3GPP TSG-RAN WG2 Meeting #25 Makuhari, Japan, Nov. 26-30, 2001, Tdoc R2-012752.
3GPP-Standards; $3^{rd}$ Generation Partnership Project; "Technical Specification Group Ran; Signalling enhancements for Circuit-Switched (CS) and Packet-Switched (PS) Connections; Analyses and Recommendations" (Release 7); 3GPP TR 25.815 v2.0.0, Technical Report; Sep. 2006, XP040292878, 43 pages.
International Preliminary Report on Patentability and Written Opinion Corresponding to International Application No. PCT/EP2010/058294; dated Jul. 31, 2012; 6 pages.
ETSI TS 125 331 V8.7.0 (Jul. 2009); ,Universal Mobile Telecommunications System (UMTS); Radio Resource Control (RRC); Protocol specification (3GPP TS 25.331 version 8.7.0 Release 8), Sophia-Antipolis Valbonne, France, relevant pp. 1-32, 126-129, 134-136, and 229, Jul. 2009.
NTT DoCoMo: "Unsuccessful security mode control procedure and Integrity Protection"; 3GPP TSG-RAN WG2 Meeting #38, Sophia Antipolis, France, Oct. 5-9, 2003;.Tdoc R2-032152; 7 pages.
NTT DoCoMo: "Unsuccessful security mode control procedure and Integrity Protection"; Change Request; 25.331 CR 2075 Version 5.6.0; 3GPP TSG-RAN WG2 Meeting #38, Sophia Antipolis, France, Oct. 5-9, 2003;.Tdoc R2-032234; Oct. 6, 2003; 5 pages.

* cited by examiner

METHOD AND ARRANGEMENT FOR MANAGING SECURITY RECONFIGURATION IN A CELLULAR COMMUNICATION SYSTEM

CROSS REFERENCE TO RELATED APPLICATIONS

This application is a continuation of U.S. application Ser. No. 13/518,919, filed on Jul. 17, 2012, which is a 35 U.S.C. § 371 national stage application of PCT International Application No. PCT/EP2010/058294, filed on 14 Jun. 2010, which itself claims priority to U.S. Provisional Patent Application No. 61/298,934, filed 28 Jan. 2010, the disclosures and contents of all of which are incorporated by reference herein in their entireties. The above-referenced PCT International Application was published in the English language as International Publication No. WO 2011/091865 A1 on 4 Aug. 2011.

TECHNICAL FIELD

The present invention relates to telecommunication systems in general and specifically to management of security reconfigurations in such systems.

BACKGROUND

For all telecommunication systems, there is a variety of reconfiguration procedures present. These procedures can be divided into two main groups, based on the nature of the parameters to be reconfigured, namely soft and physical reconfigurations. Physical reconfigurations deal with reconfigurations of a physical nature, such as radio bearer reconfiguration, transport channel reconfiguration, physical channel reconfiguration. Soft reconfigurations deal with non-physical reconfigurations, such as for example security parameter reconfiguration. For a typical scenario of 3GPP specifications, these two types of reconfigurations are treated somewhat different and consequently suffer from different and separate problems. The present disclosure will focus on soft reconfigurations, in particular security reconfigurations in relation to 3GPP specifications TS 25.331 V8.7.0 section 8.1.12.4b, "Cell Update Procedure During Security Reconfiguration". One area of improvement concerns the case of dropped calls due to a mismatch of security configurations between the network and a user terminal such as a mobile phone, as a consequence of cell reselection procedure during the security reconfiguration.

For connected 3G users in the so called CELL_FACH state or mode trying to set up a multi-RAB speech call, call drop occurs if a Cell-Update cell reselection procedure coincides with the Security Mode procedure. To further clarify, the CELL_FACH state or mode is one of the radio resource control connected modes or states of operation. As such, for a user equipment in the CELL_FACH state the following is applicable.

No dedicated physical channel is allocated to the UE.
The UE continuously monitors a FACH in the downlink.
The UE is assigned a default common or shared transport channel in the uplink (e.g. RACH) that it can use anytime according to the access procedure for that transport channel.
The position of the UE is known by UTRAN on cell level according to the cell where the UE last made a cell update.

It should be noted that Security Mode procedure includes negotiating which ciphering and integrity protection scheme the concerned parties e.g. user equipment and network node are to use for communication. A mismatch or misalignment of security configuration between two parties e.g. user terminal and a network, will ultimately lead to a dropped call since the parties are unable to communicate with each other.

During UE mobility, two such scenarios are possible:
1) Security Reconfiguration during Cell Update procedures, i.e. Security Mode Command is received in a user equipment (UE) from a network just after a Cell Update message is sent from the UE to the network.
2) Cell Update procedure during Security Reconfiguration, i.e. a Cell Update message is sent from the UE while the Security Mode procedure is still ongoing.

Prior art, as represented by 3GPP specification TS 25.331 V8.7.0, section 8.1.12.4b, "Cell update procedure during security reconfiguration," section 8.1.12.2.2, "Integrity protection configuration change," and section 8.3.1.9b, "Security reconfiguration during Cell update procedure," describe how a user equipment UE or mobile and network should handle these two cases; however, there is room for improvement to further reduce the risk of calls being dropped as a result of 3GPP specification limitations.

In general, all above mentioned problems are related to misalignment or mismatch in security (ciphering/integrity) settings when an ongoing Security Mode procedure is aborted, primarily due to Cell Update cell-reselection. If both UE and radio network controller (RNC) abort the security reconfiguration or if neither aborts, a network solution could easily handle this case. However, due to different race conditions occurring between cell update and security mode procedures, UE may abort reconfiguration but not the RNC, and vice versa. The result is an Integrity Protection (and/or ciphering) misalignment resulting in call drop.

With reference to FIG. 1, known Security Mode procedures from the UE point of view will be described. Within the time span designated "A", it is clear from the 3GPP specification TS 25.331 V8.7.0 section 8.1.12.4b, "Cell Update Procedure During Security Reconfiguration" that the UE shall abort the ongoing security mode procedure if a Cell Update needs to be sent. This Cell Update can be triggered by any of the following scenarios:
a) re-selection to a new cell
b) re-entering service area
c) periodical cell-update
d) to inform the network of a UE failure ("physical channel failure" or "RLC unrecoverable error")

For the present disclosure, the case of a user equipment aborting an ongoing security reconfiguration procedure due to reselection to a new cell will be exploited.

When it comes to the time span designated "B" above, 3GPP specifications are somewhat unclear and also limited regarding UE security configuration behavior. If a CellUpdate message is sent during the security procedure, after securityModeComplete, but before the L2ACK received, then as above, the UE shall abort the ongoing Security Mode procedure (3GPP specification TS 25.331 V8.7.0 section 8.1.12.4b, "Cell Update Procedure During Security Reconfiguration") with special handling for integrity parameter COUNT-I. Some other vague guidance is given by a statement targeting the RNC [2](3GPP specification TS 25.331 V8.7.0 section 8.1.12.2.2, "Integrity protection configuration change"), in which it is stated that the network (NW) should be aware that the UE "may" abort the security procedure.

Aborting the security procedure in the UE at this point however is not favorable, since the UE has just acknowledged to the RNC (in Security Mode Complete message) that the security reconfiguration is already performed even though the security reconfiguration is not yet fully applied in the UE until the L2ACK for securityModeComplete is received from the RNC (i.e. it is a grey area limitation in the prior art as represented by 3GPP specification TS 25.331 V8.7.0 section 8.1.12.4b, "Cell Update Procedure During Security Reconfiguration").

If the UE aborts the security reconfiguration after RNC has received the Security Mode Complete, the new security reconfiguration will be applied by the RNC. Hence there is a security mismatch, leading to call drop (as evidenced from live network analysis). The dropped call is due to the fact that the UE and the network at this point in time are using different security configurations and are unable to communicate.

SUMMARY

The present invention relates to methods and arrangements for improved security reconfiguration management in a cellular communication system. It is the object of the present invention to reduce the risk of dropped calls due to cell update procedures.

In a method of managing security reconfiguration and cell update procedures in a user equipment in a cellular communication system the following procedure is performed. A user equipment receives a security reconfiguration request from a node, and subsequently initiates and confirms the requested security reconfiguration to the node. At some point in time before node acknowledgement received, the user equipment detects a cell update trigger and aborts the already confirmed security reconfiguration in response to the detected cell update trigger. Subsequently, the user equipment provides a security status indication in response to the aborted security reconfiguration, then jointly transmits, to the node, a cell update message and the provided security status indication informing about the previously confirmed security reconfiguration being aborted.

By these features, a mismatch between the security configurations between a UE and a node in the cellular communication system is avoided. As a result, the call drop rate is reduced and the call setup rate can be improved.

According to a further aspect of the present invention, an embodiment of a user equipment in a cellular communication system includes means for detecting a cell update trigger event, and means for aborting any ongoing security reconfiguration procedure in the user equipment in response to the detected cell update trigger event. In addition, the user equipment includes means for providing a security status indication in response to the aborted security reconfiguration, and means for jointly transmitting a cell update message and the provided security status indication to a node.

According to yet a further aspect, an embodiment of a method of managing security reconfiguration and cell update procedures in a node in a cellular communication system according to the present invention includes the steps of transmitting a security reconfiguration request to a user equipment, and receiving a security reconfiguration confirmation. The node acknowledges and performs the confirmed security reconfiguration. Subsequently, the node jointly receives a cell update message and a security status indication informing about the confirmed security reconfiguration being aborted in the user equipment. Finally, the node manages the requested security reconfiguration based on the received security status indication.

According to an additional aspect, an embodiment of a node in a cellular communication system includes means for transmitting a security reconfiguration request to a user equipment, and means for receiving a security reconfiguration confirmation. In addition, the node includes means for acknowledging and performing the confirmed security reconfiguration, and means for jointly receiving a cell update message and a security status indication informing about the confirmed security reconfiguration being aborted in the user equipment. Finally, the node includes means for managing the requested security reconfiguration based on the received security status indication.

The present invention, furthermore, coordinates advantageously cell update and security reconfiguration procedures and overcomes 3GPP specification limitations as already described.

BRIEF DESCRIPTION OF THE DRAWINGS

The invention, together with further objects and advantages thereof, may best be understood by referring to the following description taken together with the accompanying drawings, in which.

ABBREVIATIONS

ACK ACKnowledgement
AM Acknowledgement Mode
CU Cell Update
CCCH Common Control Channel
CR Change Request
DCCG Dedicated Control Channel
FACH Forward Access Channel
IE Information Element
KPI Key Performance Indicators
L2 Layer 2
MP Mandatory present
OP Optionally Present
NW NetWork
RAB Radio Access Bearer
RIM Research in motion (specific UE vendor)
RLC Radio Link Control (L2 Protocol)
RNC Radio Network Controller SRB Signalling Radio Bearer
TM Transparent Mode
UM Unacknowledged Mode
3GPP 3rd Generation Partnership Project

DETAILED DESCRIPTION

The present disclosure will be described in the context of a 3GPP system; however it is equally applicable to similar systems with a similar structure.

In order to fully comprehend the benefits of the present invention, a more in-depth description of prior art solutions and their potential drawbacks is provided below.

The two previously mentioned main race scenarios observed (during multi-RAB speech call from CELL-FACH) that lead to the various dropped call symptoms are further described below and with reference to FIG. 2 and FIG. 3.

Figure 1:
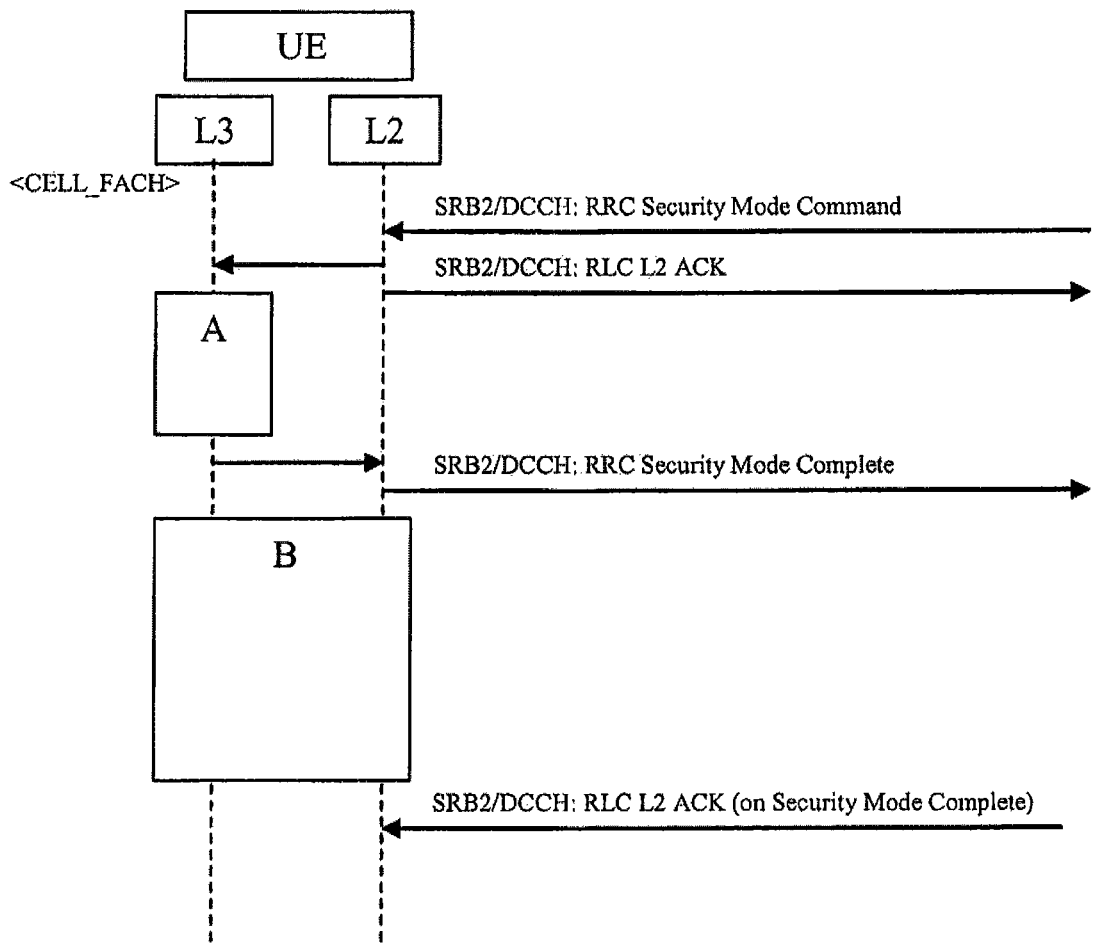
FIG. 1 is a schematic illustration of the known signaling during a security reconfiguration procedure in a user equipment.
Figure 2:
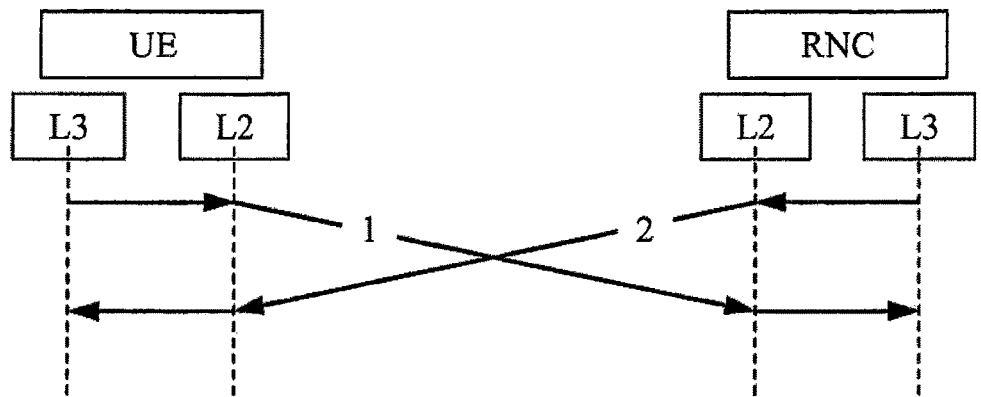
FIG. 2 is a schematic illustration of the known signaling during a security reconfiguration and cell update procedure.

In the first race scenario, with reference to FIG. 2, the Cell update message and the security mode command cross over or meet in mid-air. Consequently, the RNC receives the cellUpdate message just after Security Mode Command has been sent, while UE sends the cellUpdate message just before the Security Mode Command is received i.e. 3GPP specifications TS 25.331 V8.7.0 section 8.3.1.9b, "Security reconfiguration during Cell update procedure". In FIG. 2 time is represented on the vertical axis, increasing from the top down. The various signaling steps of the procedure in FIG. 2 are as follows:

1 Cell Update message sent from UE to RNC
2 Security Mode Command (security reconfiguration request) sent from RNC to UE.

As is clearly seen in FIG. 2, the two signals 1 and 2 meet in mid air. In this case the radio network controller will be made aware of the cell update before receiving any confirmation of the requested security reconfiguration.

Figure 3:
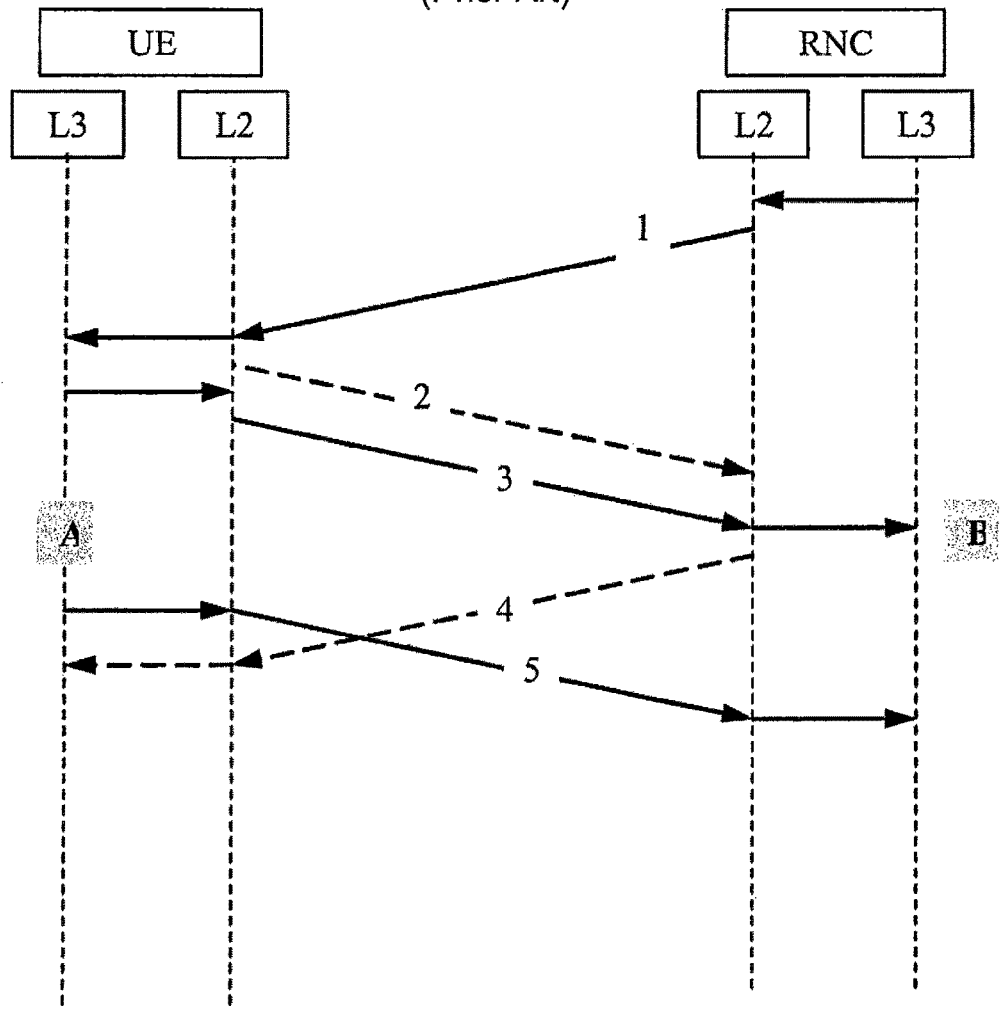
FIG. 3 is a schematic illustration of the known signaling during a security reconfiguration and cell update procedure.

In the second race scenario, with reference to FIG. 3, the UE sends the CellUpdate message before receiving a L2 acknowledgement for security mode complete i.e. 3GPP specifications TS 25.331 V8.7.0 section 8.1.12.4b, "Cell update procedure during security reconfiguration". In FIG. 3, time is represented on the vertical axis, increasing from the top down.

With reference to FIG. 3, a typical problem solved by embodiments of the present invention will be described. The various signaling steps of the procedure in FIG. 3 are as follows:

1. Security Mode Command
2. L2 ACK for (1)
3. Security Mode Complete
4. L2 ACK for (3)
5. Cell Update At time instance A the UE selects a new cell, and aborts the ongoing security reconfiguration, and rolls back to the old security reconfiguration. At time instance B, the RNC activates the new security configuration. Consequently, from time instance B the UE and the RNC are operating with different security configurations and are unable to maintain the existing call. In this case, there is a security mismatch since the UE is on "old" security settings while RNC is now on "new" security settings, and thus ultimately leads to call drop.

Basically, the present invention aims at enabling means and arrangements for avoiding a mismatch in security configuration between a network node and a user equipment due to the second race scenario above between cell update and security reconfiguration procedures.

According to a preferred embodiment of the present invention, the UE is adapted to include a security status indication e.g. information element in the Cell Update message sent from the UE to the RNC. This IE should clearly inform the RNC whether an ongoing security procedure in the UE has been aborted or not, and so the RNC can easily decide whether it is necessary also to abort and revert to old security settings or not, or take other suitable action.

Today, as described previously, it is possible for the UE to abort an ongoing security reconfiguration procedure just before the procedure completion, in order to send a Cell Update to the RNC. If the RNC however has already completed this security reconfiguration procedure at the time of reception of this cell update, then the RNC has no way of knowing for certain that the preceding security procedure has just been aborted in the UE. This is currently a limitation in the 3GPP specifications. The new proposed status indication e.g. information element IE can easily overcome the 3GPP limitation.

Figure 4:
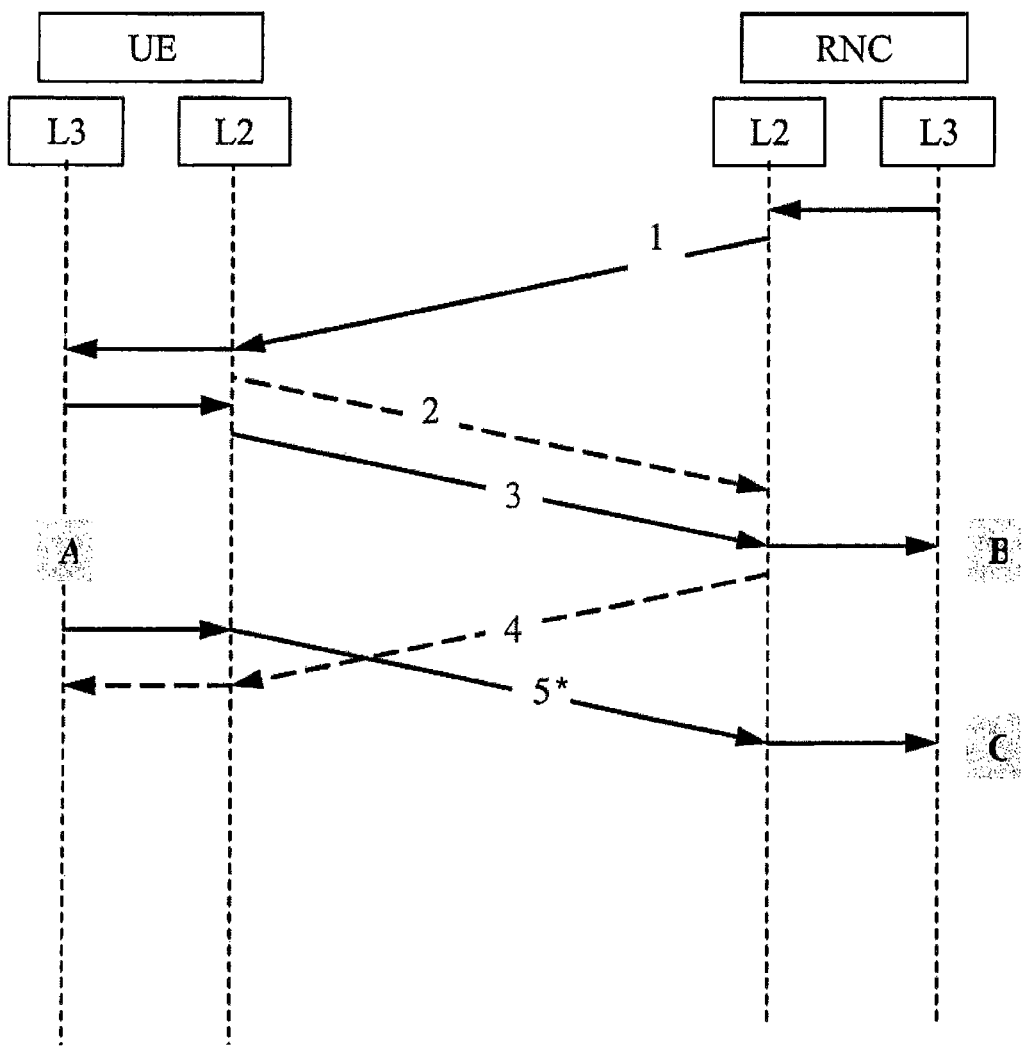
FIG. 4 is a schematic illustration of an embodiment of a method according to the present invention.

With reference to FIG. 4, a signaling scheme according to an embodiment of the present invention will be described. in comparison to the signaling scheme of FIG. 3, all steps up to step 4 are identical. Also, actions taken at time instances A and B are identical. However, in step 5 the user equipment provides a security status indication SSI in the cell update message, In this embodiment, the security status indication is provided as an information element IE that is set to TRUE if a security reconfiguration has been aborted. Consequently, at time instance C the radio network controller receives the security status indication and is informed that the user equipment has aborted the previously requested security reconfiguration. In this embodiment the radio network controller proceeds to revert or roll back to the previous security configuration. Thus, the two nodes are once again able to communicate using the same security configuration. However, it is implied that the radio network controller can take other or additional measures upon receiving the security status indication.

Figure 5:
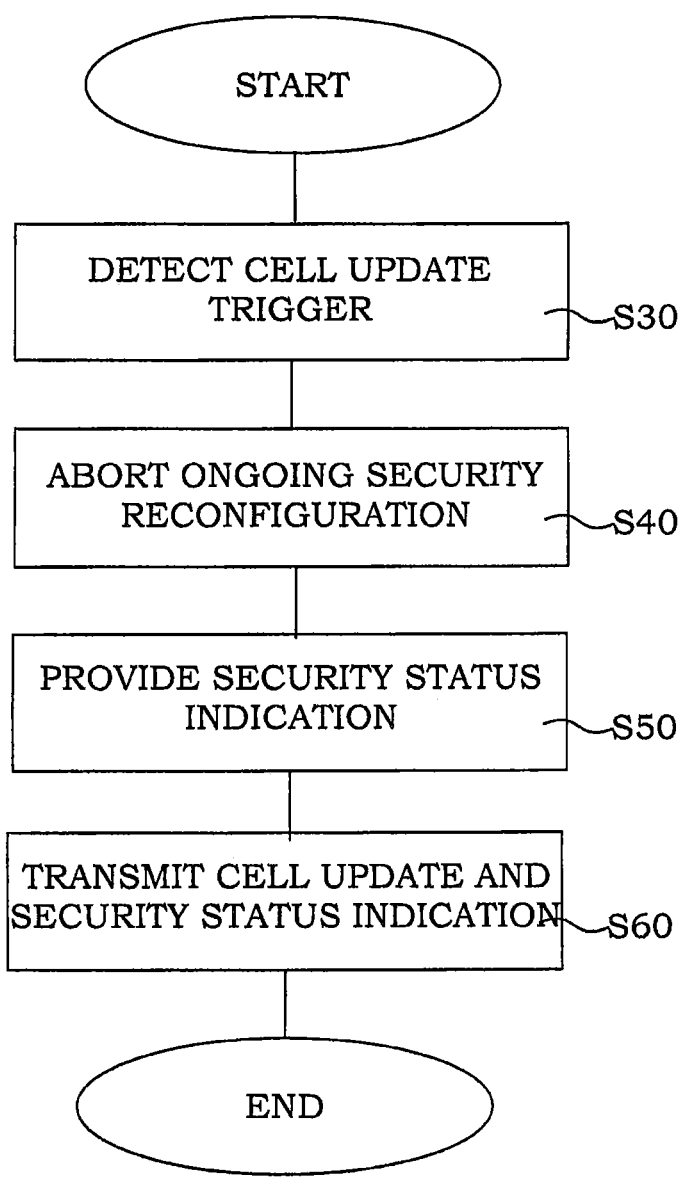
FIG. 5 is a schematic flow diagram of an embodiment of a method in a user equipment according to the present invention.

With reference to FIG. 5, a basic embodiment of a method of managing security reconfiguration and cell update procedures in a user equipment in a cellular communication system according to the present invention will be described. Initially a user equipment detects S30 a cell update trigger event. In response to the detected cell update trigger event, the user equipment aborts S40 any ongoing security reconfiguration procedure. By aborting the security reconfiguration procedure, the user equipment reverts to or rolls back to a previous e.g. already existing security configuration. Subsequently, the user equipment provides S50 a security status indication in response to the aborted security reconfiguration. Finally, the security status indication and a cell update message are jointly transmitted S60 to a node in the cellular communication system, typically a radio network controller node or similar control node.

Basically, the cell update message of prior art is amended to include a security status indication, such as a boolean information element that is set to TRUE in case of an ongoing security reconfiguration procedure being aborted in the user equipment, and set to FALSE otherwise.

Figure 6:
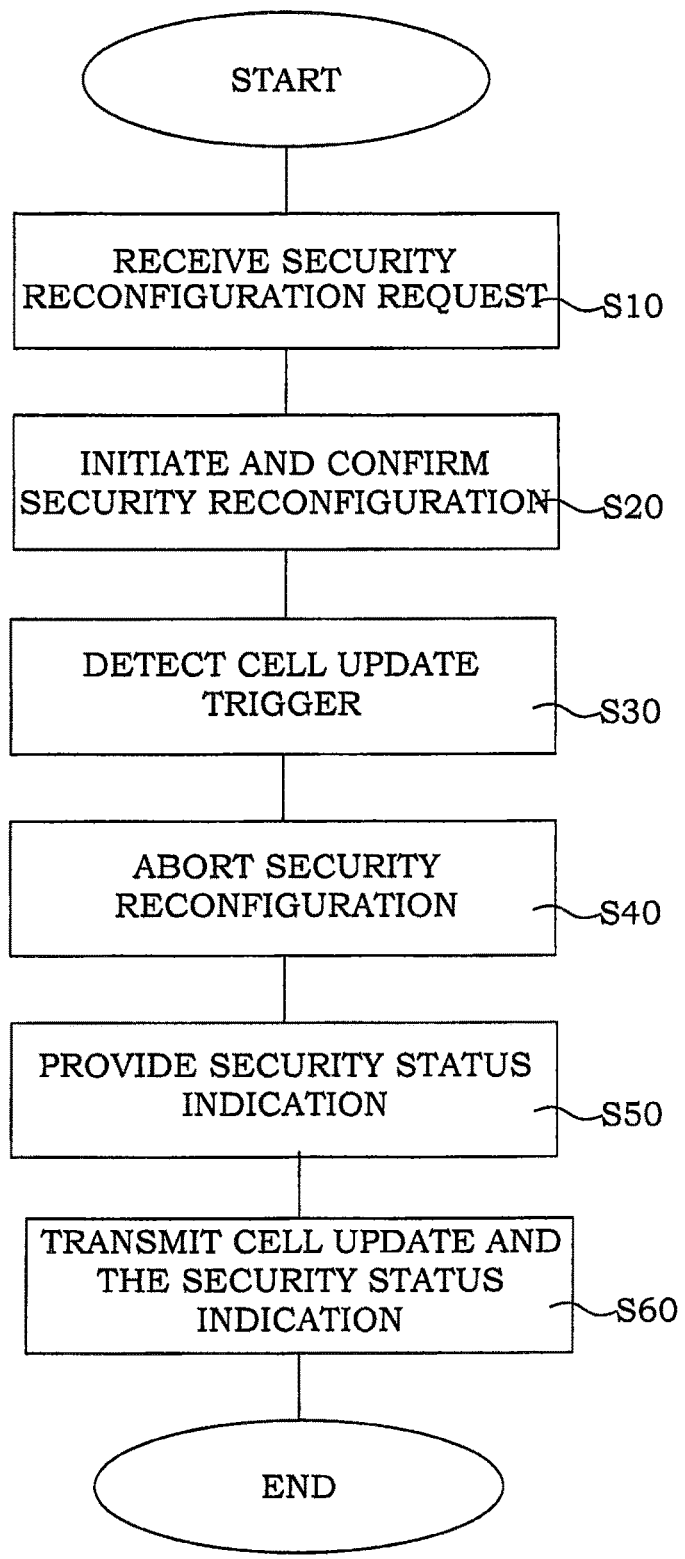
FIG. 6 is a schematic flow diagram of a further embodiment of a method in a user equipment according to the present invention.

With reference to FIG. 6, a further detailed embodiment of a method of managing security reconfiguration and cell update procedures in a user equipment in a cellular communication system according to the present invention will be described. Steps indicated in the previous embodiment are referred to with the same reference numbers.

Initially, the user equipment receives S10 a request for a security reconfiguration from a node, e.g. radio network controller. The user equipment initiates and confirms S20 the requested security reconfiguration. At some point in time before node acknowledgment received the user equipment detects S30 a cell update trigger, and is consequently forced to change or reselect a cell. In response to the detected cell update trigger, the user equipment aborts S40 the already confirmed security reconfiguration. The user equipment then provides S50 a security status indication in response to the aborted security reconfiguration. Finally, the user equipment jointly transmits S60, to the node, a cell update message, and the provided security status indication informing about the confirmed security reconfiguration being aborted.

The security status indication is preferably set to a predetermined value in response to an aborted security reconfiguration, according to a particular embodiment of the invention the status indication is provided as a boolean information element. According to a particular embodiment, the security status indication is set to TRUE only in the case of an aborted security reconfiguration and a cell update message is triggered to be sent during an ongoing security reconfiguration. Otherwise, the security status indication should be cleared/set to FALSE. The security status indication should not be set in the case where a security reconfiguration has been aborted but a cell update message is not sent until some later time after the completed security procedure.

Figure 7:
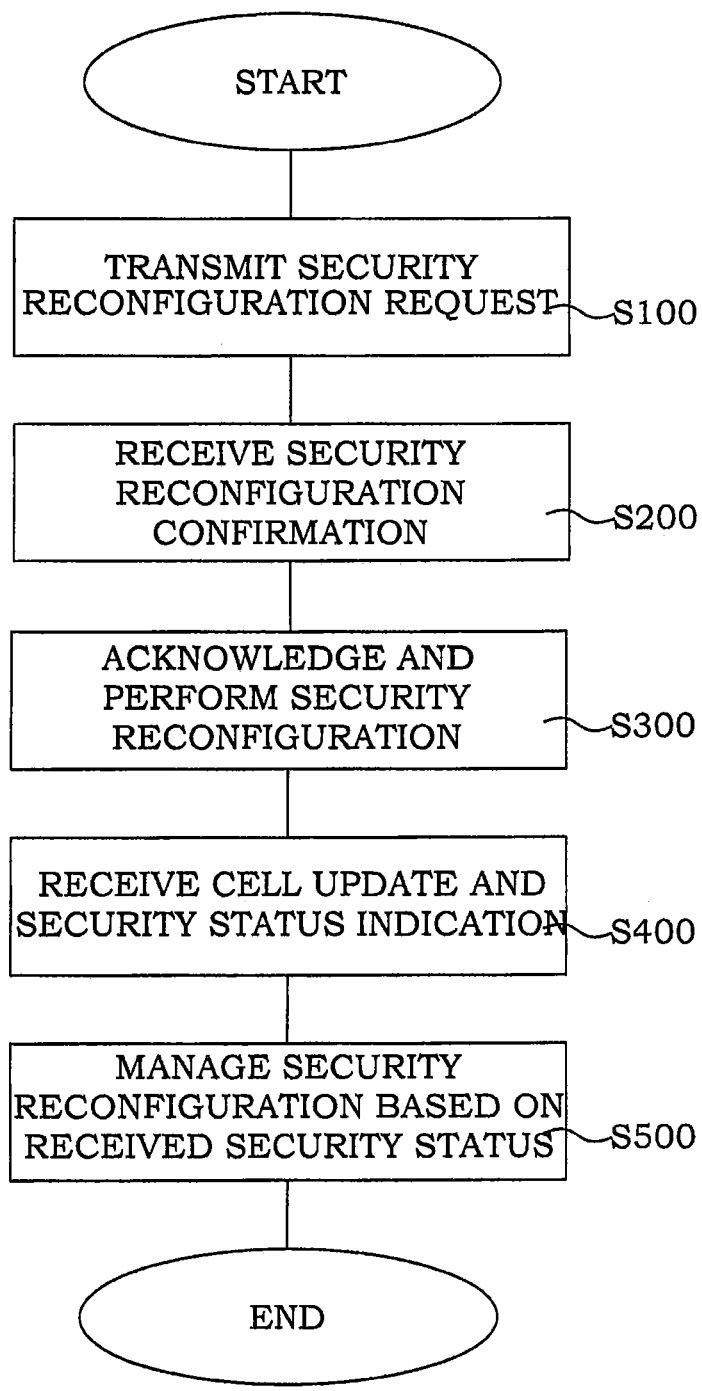
FIG. 7 is a schematic flow diagram of an embodiment of a method in a network node according to the present invention.

With reference to FIG. 7, a basic embodiment of a method of managing security reconfigurations and cell update procedures in a node, e.g. radio network controller, in a cellular communication system according to the present invention will be described.

At some point in time the node e.g. radio network controller, transmits S100 a security reconfiguration request to a user equipment. Upon receiving S200 a confirmation for the security reconfiguration, the node acknowledges S300 and performs the security reconfiguration. Subsequently, the radio network controller jointly receives S400 a cell update message and a security status indication in the cell update message, the indication informing about the confirmed security reconfiguration being aborted. Finally, the radio network controller manages its security configuration based on the received security status indication. One possible action would be to revert to a previous security configuration in response to the received status indication. Another possible action would be to reattempt the aborted security reconfiguration. In addition, other actions are possible, under the condition that the radio network controller recognizes the included security status indication.

Figure 8:
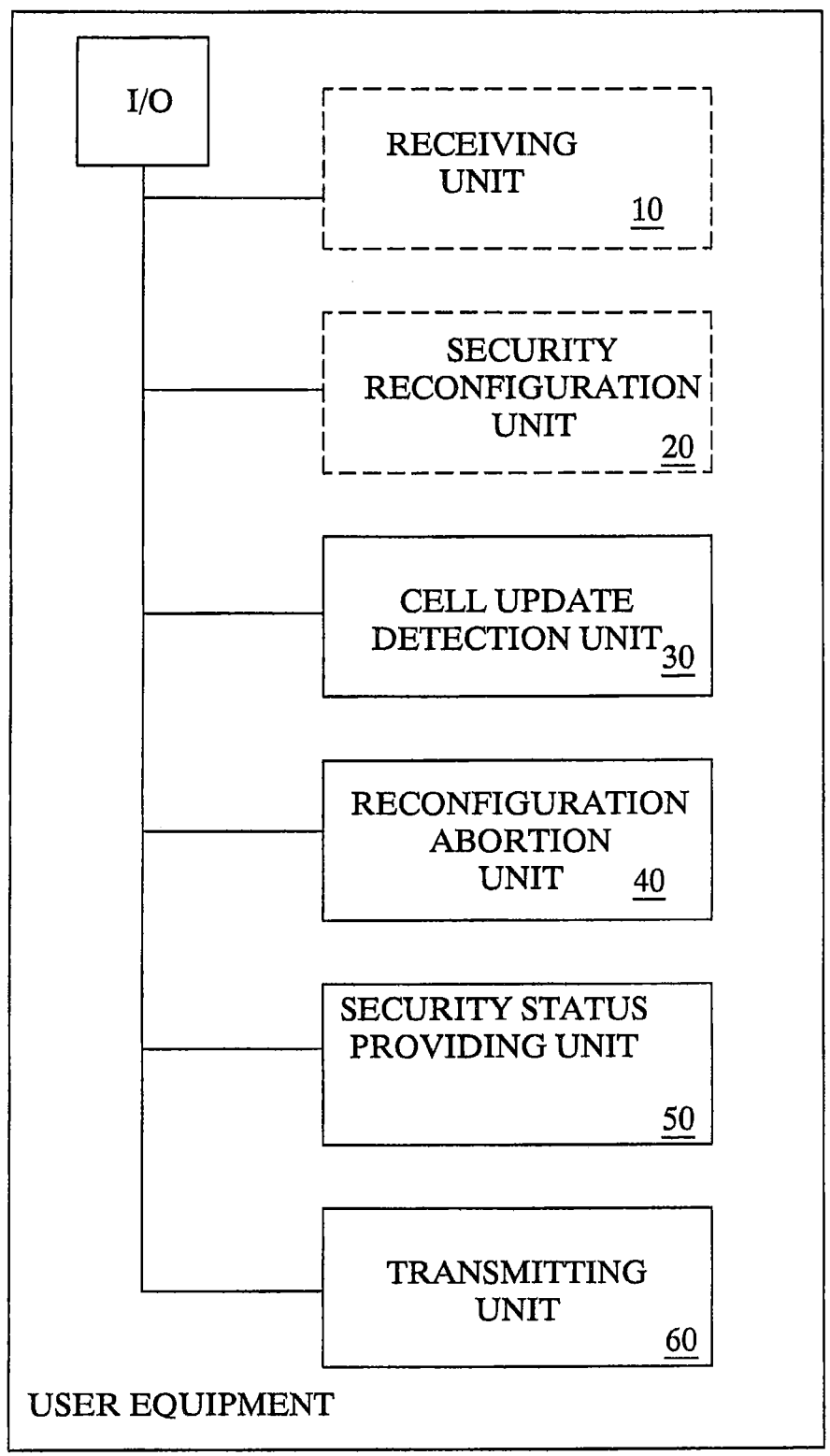
FIG. 8 is a schematic illustration of an embodiment of a user equipment according to the present invention.

With reference to FIG. 8, a general embodiment of a user equipment according to the present invention will be described. The user equipment includes a unit 30 for detecting a cell update trigger event, and a unit 40 for aborting any ongoing security reconfiguration procedure in the user equipment in response to the detected cell update trigger event. In addition, the user equipment includes a unit 50 for providing 50 a security status indication in response to the aborted security reconfiguration, and finally a unit for jointly transmitting 60 a cell update message and the provided security status indication to a node in the communication system.

Figure 9:
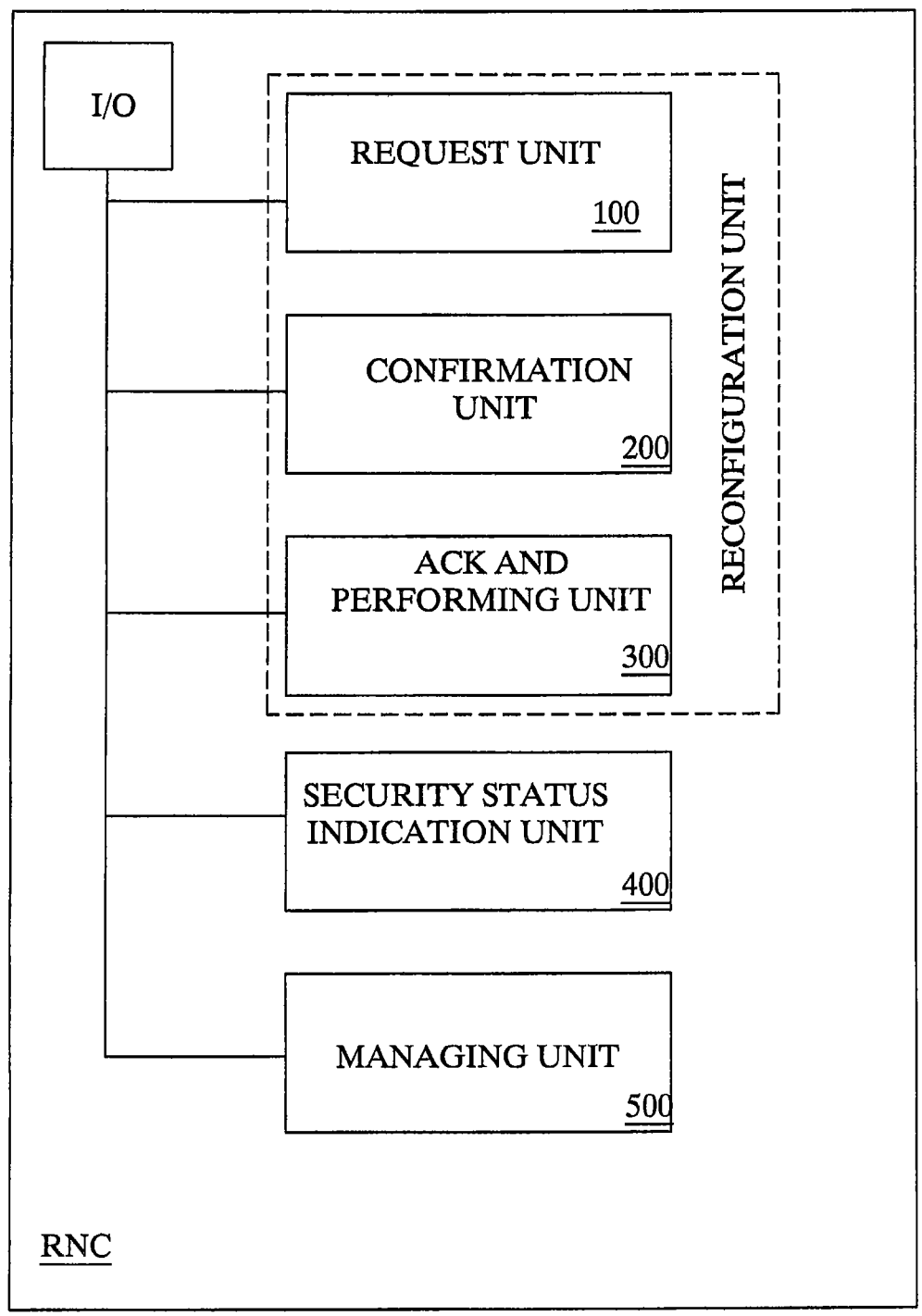
FIG. 9 is a schematic illustration of an embodiment of a network node according to the present invention.

According to a particular embodiment, also with reference to FIG. 8 (in particular the dotted boxes), the user equipment further includes a unit 10 for receiving a security reconfiguration request from a node, and a unit 20 for initiating and confirming the requested security reconfiguration;

With reference to FIG. 9, an embodiment of a node according to the present invention will be described. The node e.g. radio network controller includes a unit 100 for transmitting a security reconfiguration request to a user equipment, and a unit 200 for receiving a security reconfiguration confirmation from the user equipment. In addition, the node includes a unit 300 for acknowledging and performing the confirmed security reconfiguration, and a unit 400 for jointly receiving a cell update message and a security status indication informing about the previously confirmed security reconfiguration being aborted. Finally, the node includes a unit 500 for managing 500 the previously requested security reconfiguration based on the received security status indication.

It is understood that the functional parts of the embodiments can be implemented as hardware e.g. processors within or as software elements e.g. algorithms executable on a computer. It is also understood that some parts of the functionality can be provided outside the user equipment and/or node and communicated to the user equipment and node using other means of communication.

Advantages of the present invention include:

The main benefit of the proposed new IE is to overcome the 3GPP limitations and thus avoid unnecessary dropped calls at security reconfiguration on CELL_FACH (e.g. typically at speech call setup from CELL_FACH), hence improved KPIs and thus increased revenue and end-user satisfaction.

This new "Security Status Indicator" IE ensures there is no security mismatch between UE and RNC, as the RNC also rolls back to "old" security settings if cellUpdate received from UE with IE="TRUE", indicating the UE has aborted security procedure due to cellUpdate cell re-selection. As RNC and UE are using the same "old" security keys after the security procedure is aborted, then no abnormal call drop should occur.

In case of any unforeseen scenarios, this IE will allow the network to consider other alternative corrective actions rather than drop the call as occurs today.

The invention claimed is:

1. A method of managing security reconfiguration and cell update procedures in a user equipment in a cellular communication system, the method comprising:
   receiving a security mode command;
   initiating a security reconfiguration procedure in response to the security mode command;
   after initiating the security reconfiguration procedure and before completion of the security reconfiguration procedure, detecting a cell update trigger event;
   aborting the security reconfiguration procedure in said user equipment in response to said detecting the cell update trigger event;
   after detecting the cell update trigger event, providing a security status indication that comprises an aborted status of the security reconfiguration procedure; and
   transmitting a cell update message comprising said security status indication to a node in response to aborting the security reconfiguration procedure.

2. The method according to claim 1,
   wherein said detecting the cell update trigger event is preceded by confirming initiation of the security reconfiguration procedure.

3. The method according to claim 1, wherein providing said security status indication comprises setting said security status indication to a predetermined value.

4. The method according to claim 1, wherein transmitting said cell update message and said security status indication comprises transmitting said cell update message and said security status indication into a single message.

5. The method according to claim 4, wherein said security status indication is provided as a boolean information element in the single message.

6. The method according to claim 1, wherein providing the security status indication comprises setting the security status indication to a predetermined value in response to said aborted security reconfiguration and in response to the cell update message being triggered to be sent during an ongoing security reconfiguration procedure.

7. A method of managing security reconfiguration and cell update procedures in a node in a cellular communication system, the method comprising:
   transmitting a security reconfiguration request to a user equipment;
   receiving a security reconfiguration confirmation issued by the user equipment in response to receipt of the security reconfiguration request;
   acknowledging and performing said confirmed security reconfiguration;
   receiving a cell update message comprising a security status indication from the user equipment, said security status indication informing the node that said confirmed security reconfiguration was aborted by the user equipment, wherein the cell update message was transmitted in response to the security reconfiguration being aborted; and
   updating the security reconfiguration to accord with said received cell update message and security status indication.

8. The method according to claim 7, wherein said updating comprises updating said node to revert to a previous security configuration in response to receiving said security status indication from the user equipment.

9. The method according to claim 7, wherein said updating comprises said node retransmitting said aborted security reconfiguration request in response to receiving said security status indication from the user equipment.

10. The method of claim 7, wherein the security status indication encodes the aborted status of the confirmed security reconfiguration as a single bit of binary data.

11. A user equipment in a cellular communication system, the user equipment comprising:
   a processor configured to:
      receive a security mode command,
      initiate a security reconfiguration procedure in response to the security mode command,
      after initiating the security reconfiguration procedure and before completion of the security reconfiguration procedure, detect a cell update trigger event,
      abort the security reconfiguration procedure in said user equipment in response to the detected cell update trigger event,
      provide a security status indication that comprises an aborted status of the security reconfiguration procedure, and
      transmit a cell update message comprising said security status indication to a node in response to aborting the security reconfiguration procedure.

12. The user equipment according to claim 11, wherein the processor is further configured to, prior to detecting the cell update trigger event, confirm the security reconfiguration procedure.

13. The user equipment according to claim 11, wherein the processor is configured to provide the security status indication by setting the security status indication to a predetermined value in response to the aborted security reconfiguration and in response to the cell update message being triggered to be sent during an ongoing security reconfiguration procedure.

14. A method of operating user equipment in a cellular communication system, comprising:
   performing a security reconfiguration procedure within the user equipment in response to a security reconfiguration request, which is received from a node in the cellular communication system;
   issuing, to the node, a first acknowledgment that a security reconfiguration in accord with the security reconfiguration request is complete within the user equipment;
   after said issuing and before receipt, by the user equipment, of a second acknowledgment transmitted by the node, which confirms receipt by the node of the first acknowledgment, detecting a cell update trigger event; and then
   before receipt of the second acknowledgement by the user equipment: (i) aborting the security reconfiguration procedure in the user equipment in response to the cell update trigger event; and (ii) transmitting, to the node, a cell update message comprising a security status indication that comprises an aborted status of the security reconfiguration procedure in response to the security reconfiguration procedure being aborted.

15. The method of claim 14, wherein the security status indication is concatenated to the cell update message during said transmitting.

16. The method of claim 15, wherein the security status indication is transmitted as a Boolean information element.

17. A method of operating user equipment in a cellular communication system, comprising:
   performing a security reconfiguration procedure within the user equipment in response to a security reconfiguration request, which is received from a node in the cellular communication system;
   issuing, to the node, a first acknowledgment that a security reconfiguration in accord with the security reconfiguration request is complete within the user equipment;
   after said issuing and before receipt, by the user equipment, of a second acknowledgment transmitted by the node, which confirms receipt by the node of the first acknowledgment, detecting a cell update trigger event; and then before receipt of the second acknowledgement by the user equipment: (i) aborting the security reconfiguration procedure in the user equipment in response to the cell update trigger event; and (ii) transmitting, to the node, a cell update message comprising a security status indication that comprises an aborted status of the security reconfiguration procedure;
      wherein the security status indication is concatenated to the cell update message during said transmitting;
      wherein the security status indication is transmitted as a Boolean information element; and
      wherein the Boolean information element is configured to be set to a first binary value when the aborted status of the security reconfiguration procedure is TRUE and a second binary value when the aborted status of the security reconfiguration procedure is FALSE.

18. The method of claim 17, wherein the first binary value is 1b and the second binary value is 0b or vice versa.

19. A node in a cellular communication system, comprising:
a processor configured to perform operations comprising:
transmitting a security reconfiguration request to a user equipment in the cellular communication system;
receiving a first acknowledgement from the user equipment that a security reconfiguration in accord with the security reconfiguration request is complete;
transmitting a second acknowledgment to the user equipment, which confirms receipt by the node of the first acknowledgment; and
receiving, from the user equipment, a cell update message comprising a security status indication that comprises an aborted status of the security reconfiguration associated with the first acknowledgement, wherein the cell update message is transmitted in response to the security reconfiguration being aborted.

20. The node of claim 19, wherein a timing of the issuance of the cell update message and security status indication by the user equipment precedes receipt by the user equipment of the second acknowledgment.

21. The node of claim 19, wherein the node is a radio network controller (RNC).

22. The node of claim 19, wherein the security status indication encodes that aborted status of the security reconfiguration as a single bit of binary data.

23. A user equipment in a cellular communication system, the user equipment comprising:
a processor configured to:
receive a security mode command,
initiate a security reconfiguration procedure in response to the security mode command,
after initiating the security reconfiguration procedure and before completion of the security reconfiguration procedure, detect a cell update trigger event,
abort the security reconfiguration procedure in the user equipment in response to the detected cell update trigger event,
provide a security status indication that comprises an aborted status of the security reconfiguration procedure, and
jointly transmit a cell update message and said security status indication to a node in response to the security reconfiguration procedure being aborted.

* * * * *

UNITED STATES PATENT AND TRADEMARK OFFICE
CERTIFICATE OF CORRECTION

PATENT NO. : 9,985,995 B2  
APPLICATION NO. : 15/000862  
DATED : May 29, 2018  
INVENTOR(S) : McGann Page 1 of 1

It is certified that error appears in the above-identified patent and that said Letters Patent is hereby corrected as shown below:

On the Title Page

Item (73), under "Assignee", in Column 1, Line 1, delete "Ericcson" and insert -- Ericsson --, therefor.

In Column 1, under "Notice", Line 3, delete "0 days. days." and insert -- 0 days. --, therefor.

In the Specification

In Column 1, Line 11, delete "2012," and insert -- 2012, now Pat. No. 9,270,706, --, therefor.

In Column 2, Line 63, delete "RNC [2]" and insert -- RNC --, therefor.

In Column 4, Line 56, delete "DCCG" and insert -- DCCH --, therefor.

In Column 5, Lines 15-16, delete "CELL-FACH)" and insert -- CELL_FACH) --, therefor.

In Column 6, Line 23, delete "described. in" and insert -- described. In --, therefor.

In Column 6, Line 26, delete "step 5" and insert -- step 5* --, therefor.

In Column 6, Line 28, delete "message," and insert -- message. --, therefor.

In Column 8, Lines 2-3, delete "reconfiguration;" and insert -- reconfiguration. --, therefor.

Signed and Sealed this  
Fourth Day of September, 2018

Andrei Iancu  
*Director of the United States Patent and Trademark Office*